(12) United States Patent
Belisle

(10) Patent No.: US 8,785,347 B2
(45) Date of Patent: Jul. 22, 2014

(54) GULF OIL SPILL UNDERWATER OLEOPHILIC HYDROPHOBIC OIL-CAPTURING WATER PERMEABLE DRAG-NET

(76) Inventor: William Redvers Belisle, New Orleans, LA (US)

( * ) Notice: Subject to any disclaimer, the term of this patent is extended or adjusted under 35 U.S.C. 154(b) by 122 days.

(21) Appl. No.: 12/802,632

(22) Filed: Jun. 11, 2010

(65) Prior Publication Data

US 2011/0306491 A1    Dec. 15, 2011

(51) Int. Cl.
*B01J 20/22* (2006.01)
*B01J 20/26* (2006.01)

(52) U.S. Cl.
CPC . *B01J 20/22* (2013.01); *B01J 20/26* (2013.01)
USPC ............................ 502/401; 502/400; 502/402

(58) Field of Classification Search
USPC .......... 502/400–402; 210/634, 644, 649, 680, 210/690, 691, 692, 693, 923, 924
See application file for complete search history.

(56) References Cited

U.S. PATENT DOCUMENTS

| 3,770,575 | A | * | 11/1973 | Ball | 162/100 |
| 4,181,513 | A | * | 1/1980 | Fukuda et al. | 96/153 |
| 4,759,847 | A | * | 7/1988 | Medbury | 210/484 |
| 5,256,476 | A | * | 10/1993 | Tanaka et al. | 442/1 |
| 6,326,070 | B1 | * | 12/2001 | Sodergren | 428/36.1 |
| 6,344,519 | B1 | * | 2/2002 | Rink et al. | 525/97 |

FOREIGN PATENT DOCUMENTS

| JP | H49-102921 | * | 9/1974 | C22C 11/00 |
| JP | H53-143776 | * | 12/1978 | B29D 7/00 |
| JP | H08-207561 | * | 8/1996 | B60J 3/00 |

* cited by examiner

*Primary Examiner* — Stanley Silverman
*Assistant Examiner* — Daniel Berns
(74) *Attorney, Agent, or Firm* — Leininger Patents and Technology Management LLC

(57) ABSTRACT

An underwater oleophilic hydrophobic oil-capturing water permeable drag-net with the porous oil-capturing water-repelling and water-permeable component positioned in the back of and connected to the drag-net that can be dragged vertically through the underwater oil spill area of the Gulf to remove oil is presented. The invention is made of various sizes depending on the area of the oil spill area; including 100 ft high (north to south), 100 ft wide (east to west) and 10 ft deep (front to back). The net mesh-like material is made from threads and wires knotted, twisted, and woven to form a regular pattern with fine spaces between the threads with each strand of a metal, plastic, wire and fiber net-type material made of and covered with organic and inorganic Oleophilic hydrophobic and superhydrophobic, oil attracting and oil bonding molecules, materials or sorbents including Superhydrophobic materials. The underwater drag-net collects large amounts of oil from the Gulf and reduces the negative impact of the Gulf oil spill on the Gulf and its shores.

5 Claims, 1 Drawing Sheet

Figure 1:
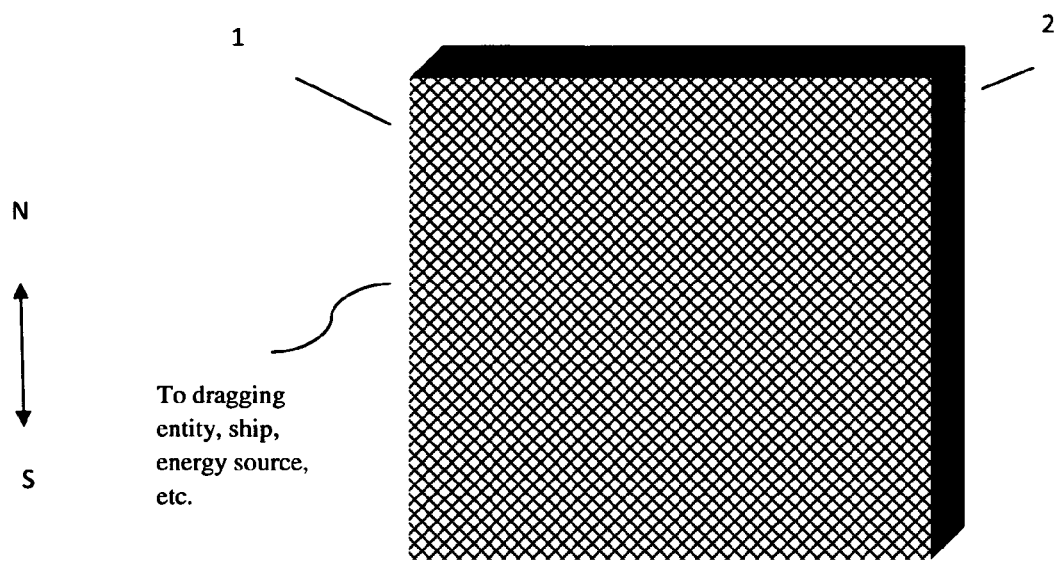

GULF OIL SPILL UNDERWATER OLEOPHILIC HYDROPHOBIC OIL-CAPTURING WATER PERMEABLE DRAG-NET

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention/Technical Field

The following is 'A statement of the field of art to which the invention pertains':
1. U.S. Class 210 Field of Search: 210/150, 210/219, 210/538, 210/608, 210/617, 210/632
2. U.S. Class 210 Field of Search: 210/693. 210/502.1, 210/923, 210/924, 210/925
3. U.S. Class 210 Field of Search: 210/221.2, 210/109, 210/124, 210/221, 210/221.1, 210/97, 210/217
4. U.S. Class 210 Field of Search: 210/660, 210/680, 210/690, 210/922
5. U.S. Class 521 Field of Search: 521/146, 210/639, 521/148
6. U.S. Class 502 Field of Search: 502/401, 210/691, 210/924, 252/184, 252/363.5
7. U.S. Class 210 Field of Search: 210/693, 210/502.1, 210/923, 210/924, 210/925
8. U.S. Class 134 Field of Search: 134/4, 134/10, 134/40, 134/6
9. U.S. Class 210 Field of Search: 210/242.3, 210/923
10. U.S. Class 210 Field of Search: 210/680, 210/242, 210/693, 210/924

2. Description of Related Art

Oya (2009) describes a treatment apparatus containing waste water, oil and fat that uses enzyme and agitation to decomposition and treatment. Rink et al. (2007) describe oil porous sacks made of a pair of mesh sheets bound together and filled with oil-trapping tubular bodies deployed to collect oil floating on water. Chen et al. (2008) describe a mechanical gasification chamber or vessel used to remove oily matter from water. Arnott (2006) describe the use of crushed glass applied to, and then removed from an oil containing surface. Valkanas et al. (2004) describe a polypropylene net with macroreticular polymers including pylystyrene, trimeric copolymer with styrene, ethylene, butadiene (SEBS) elastomeric (SBR) with styrene saturation and the net is swept on the surface of water basins, harbors or the surface of sea to collect oily matter and petroleum. Solis (2002) describes a flexible ballast feeding pipe containing sorbent material and as the pipe is lowered to a predetermined depth below and oil spill surface, the sorbent is injected through injection nozzles in the pipe into the underwater medium to facilitate uniform oil sorption. Rink et al. (1999) describe porous sacks filled with toroidal bodies of polymers sewn a perimeter ring to retain a flat profice, and a netting that closes to help inhibit outflow of the oil when the sack is retrieved, and the sacks are applied to the water surface by ship or plane, collect oil on the surface and are collected. Allen et al. (1995) describe a land oil spill recover method using a plurality of side-by-side thermoplastic oleophilic fibers meltblown onto the land surface to form an oil absorbent meltblown web thereon. Karlberg (1995) describes a boom system for skimming an oil slick from the surface of a body of water. Allen et al. (1993) describe a method of depositing a polymeric web on an offshore oil contaminated water surface and melting the polymer thereon.

The prior inventions do not describe a Gulf of Mexico oil spill underwater oleophilic hydrophobic oil-capturing water permeable drag-net.

BRIEF SUMMARY OF THE INVENTION

It is the objective of the invention to provide an oleophilic hydrophobic oil-capturing water permeable drag-net to be moved vertically through the underwater oil spill areas to remove oil from the Gulf of Mexico. The claimed invention provides a massive, threads and wires knotted, twisted, and woven to form a regular pattern with very fine spaces between the threads and wires and made of and covered with oil-attracting water-repelling materials. An oil-capturing, oleophilic, hydrophobic porous backing across the entire back surface of the drag-net is also provided. The drag-net is dragged through underwater oil-saturated areas, removes oil, is cleaned of the oil, and the process is repeated. The claimed invention may be dragged through oil-saturated areas from just below the Gulf upper surface down to the Gulf floor.

BRIEF DESCRIPTIONS OF THE SEVERAL VIEWS OF THE DRAWINGS

The present invention will be more fully understood by references to the following brief description thereof when read in conjunction with the attached drawings, and wherein:

FIG. 1. A simple front view showing the north and south vertical position of a rectangular shaped underwater oleophilic hydrophobic oil-capturing water permeable drag-net with the porous oil-capturing water repelling component positioned in the back of, and connected to the drag-net.

Figure 2:
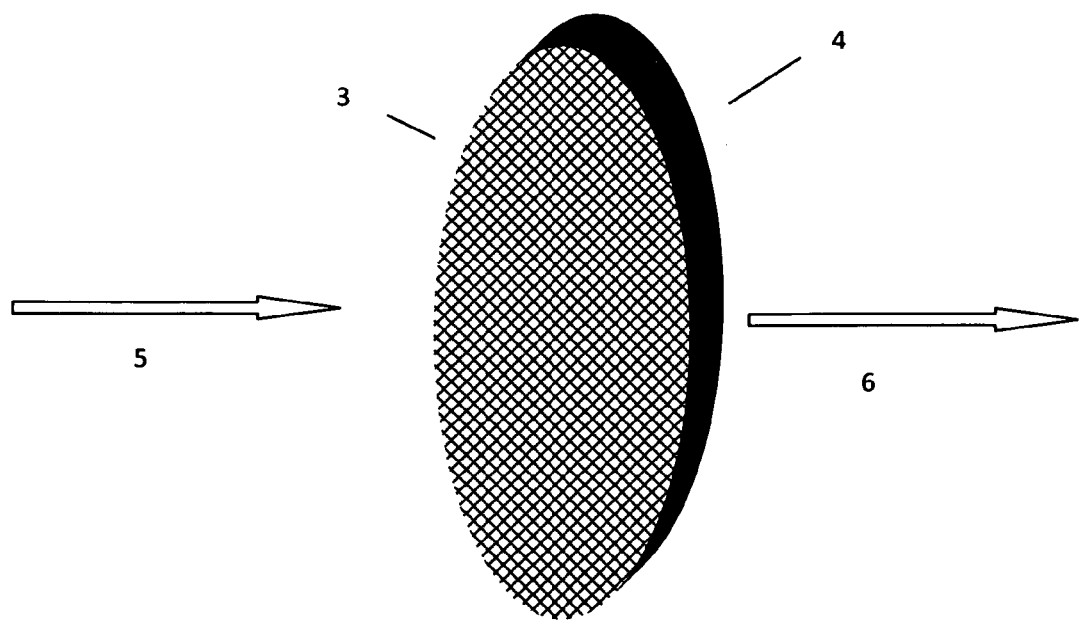

FIG. 2. A simple quarter angle view of a circular shaped section of the underwater oleophilic hydrophobic oil-capturing water permeable drag-net with the porous oil-capturing water repelling component positioned in the back of, and connected to the drag-net showing the direction of the underwater Gulf Oil spill moving into the invention and only water coming out of, and through the invention with the oil retained in the invention.

DETAILED DESCRIPTION OF THE INVENTION

Present methods of removing the oil spill from the Gulf of Mexico include dispersing chemicals, skimming the Gulf surface, spreading and adding sorptive materials on the Gulf surface, and oil-water separation techniques.

The present invention, as shown in FIG. 1, provides a method of dragging an underwater oleophilic hydrophobic oil-capturing water permeable drag-net, 1 and 3, with the porous oil-capturing water repelling component, 2 and 4, positioned in the back of, and connected to the drag-net, through underwater oil-saturated areas of the Gulf to collect oil and remove oil from the Gulf. The net mesh-like material is made from threads and wires knotted, twisted, and woven to form a regular pattern with fine spaces between the threads.

Each strand of a metal, plastic, wire and fiber net-type material is made of and covered with organic and inorganic Oleophilic hydrophobic and superhydrophobic, oil attracting and oil bonding molecules, materials or sorbents. Superhydrophobic materials are applied to the net-type material using casting techniques, vapor deposition, particle deposition, sol-gel techniques and allowed to solidify and bind to the net-type material. Sorbents applied to the drag-net include natural organic, natural inorganic, and synthetic sorbents. The oil-attracting water-repelling porous media backing material of the drag-net is bound and connected to the back of the dragnet and is of similar width as the drag-net threads. The diameter of the drag-net threads may be of various sizes including $1 \times 10^{-20}$ cm to $1 \times 10^{10}$ cm. The invention may be made of various sizes depending on the area of the oil spill area; including 100 ft high (north to south), 100 ft wide (east to west) and 10 ft deep (front to back). The underwater oleophilic hydrophobic oil-capturing water permeable drag-net may be connected to ships, boats, underwater motorized and other dragging devices, to energy sources and is dragged through the subsurface oil-spill areas of the Gulf to collect oil from the Gulf.

Natural organic sorbents may also include peat moss, straw, hay, sawdust, ground corncobs, feathers, and other readily available carbon-based products. The invention will minimize the use of organic sorbents that adsorb water as well as oil, causing the sorbents to sink and that spread on the water. Natural inorganic sorbents may also include clay, perlite, vermiculite, glass wool, sand, or volcanic ash. Synthetic sorbents may include man-made materials similar to plastics, such as polyurethane, polyethylene, and polypropylene that are designed to adsorb liquids onto their surfaces. Other synthetic sorbents may include cross-linked polymers and rubber materials, which absorb liquids into their solid structure.

FIG. 2 depicts a circular shaped section of the underwater oleophilic hydrophobic oil-capturing water permeable drag-net, 3, with the porous oil-capturing water repelling component, 4, positioned in the back of, and connected to the drag-net, showing the direction of the underwater Gulf oil spill, 5, moving into the invention and only water coming out of, 6, and through the invention with the oil retained in the invention.

I claim:

1. I claim an oil capturing device consisting of:
  a net, wherein said net consists of strands and apertures wherein said strands consist of fiber or plastic, and are coated with oleophilic and hydrophobic oil sorbents, wherein said oleophilic and hydrophobic oil sorbents are made of a material selected from the group consisting of clay, perlite, fiberglass, vermiculite, and volcanic ash.

2. I claim an oil capturing device consisting of:
  a net, wherein said net consists of strands and apertures, wherein said strands are coated with oleophilic and hydrophobic oil sorbents, wherein said oleophilic and hydrophobic oil sorbents are made of a material selected from the group consisting of peat moss, straw, hay, sawdust, and ground corncobs.

3. The device of claim 2 wherein said strands consist of metal.

4. The device of claim 2 wherein said strands consist of fiber.

5. The device of claim 2 wherein said strands consist of plastic.

* * * * *